(12) United States Patent
Yang

(10) Patent No.: US 8,515,606 B2
(45) Date of Patent: Aug. 20, 2013

(54) TORQUE MANAGEMENT METHOD FOR HYBRID ELECTRIC MOTOR

(75) Inventor: Shangdong Yang, Anhui (CN)

(73) Assignee: Chery Automobile Co., Ltd, Anhui (CN)

( * ) Notice: Subject to any disclaimer, the term of this patent is extended or adjusted under 35 U.S.C. 154(b) by 459 days.

(21) Appl. No.: 12/680,778

(22) PCT Filed: Sep. 27, 2008

(86) PCT No.: PCT/CN2008/072572
§ 371 (c)(1),
(2), (4) Date: Mar. 30, 2010

(87) PCT Pub. No.: WO2009/046673
PCT Pub. Date: Apr. 16, 2009

(65) Prior Publication Data
US 2010/0286855 A1 Nov. 11, 2010

(30) Foreign Application Priority Data

Sep. 30, 2007 (CN) .......................... 2007 1 0164139

(51) Int. Cl.
*B60L 11/00* (2006.01)
(52) U.S. Cl.
USPC .................. 701/22; 701/67; 701/101; 310/71
(58) Field of Classification Search
USPC ............. 701/22, 67, 101; 310/71; 290/40 C; 180/65.265; 123/179.3
See application file for complete search history.

(56) References Cited

U.S. PATENT DOCUMENTS

| 6,321,143 | B1 | 11/2001 | Phillips | |
|---|---|---|---|---|
| 2002/0020381 | A1* | 2/2002 | Pels | ........................... 123/179.3 |
| 2002/0105188 | A1* | 8/2002 | Tomikawa | ................... 290/40 C |
| 2005/0189828 | A1* | 9/2005 | Nakayama et al. | ............. 310/71 |
| 2008/0086255 | A1* | 4/2008 | Oshima et al. | ................. 701/101 |
| 2009/0112427 | A1* | 4/2009 | Heap et al. | ....................... 701/67 |
| 2009/0204280 | A1* | 8/2009 | Simon et al. | ..................... 701/22 |
| 2010/0038158 | A1* | 2/2010 | Whitney et al. | ........... 180/65.265 |

FOREIGN PATENT DOCUMENTS

| CN | 1654854 A | 8/2005 |
|---|---|---|
| CN | 1897449 A | 1/2007 |
| CN | 1311999 C | 4/2007 |
| CN | 1980809 A | 6/2007 |
| CN | 1328101 C | 7/2007 |
| CN | 101024397 A | 8/2007 |
| CN | 101174806 A | 5/2008 |
| DE | 19617548 A1 | 11/1997 |

(Continued)

OTHER PUBLICATIONS

European Search Report EP 08 83 7147: Dated Jun. 20, 2011.

(Continued)

*Primary Examiner* — James Trammell
*Assistant Examiner* — Sanjeev Malhotra
(74) *Attorney, Agent, or Firm* — Kilpatrick Townsend & Stockton LLP

(57) ABSTRACT

A motor torque management method of hybrid vehicles. The method includes torque synthesis and limitation in electric driving mode, torque synthesis and limitation in electricity generating mode, and torque arbitrating management. Wherein, the torque arbitrating management arbitrates torque according to its priority, and sends the torque request with the highest priority to a motor controller (5).

18 Claims, 6 Drawing Sheets

(56) References Cited

FOREIGN PATENT DOCUMENTS

| | | |
|---|---|---|
| DE | 10349445 A1 | 5/2004 |
| WO | 2004030970 A2 | 4/2004 |
| WO | 2006053622 A1 | 5/2006 |
| WO | 2006/069833 A1 | 7/2006 |

OTHER PUBLICATIONS

Yan-Chun Gu., "Investigation to Coordinated Torque Control Strategy of Parallel Hybrid Electric Vehicles", China Academic Journal Electronic Publishing House, Journal of System Stimulation, vol. 19, No. 3, Feb. 2007.

International Search Report PCT/CH2008/072572; Dated Jan. 15, 2009.

Sun et al. "Design and Simulation for torque management strategy of parallel hybrid electric vehicle", Beijing Automotive Engineering, 2007. p. 27-30, 46), with English abstract.

Yi Tong, "Torque Management Strategy for Hybrid Electric Vehicles", J Tsinghua University (Science and Technology), 2003, vol. 43, No. 8.

* cited by examiner

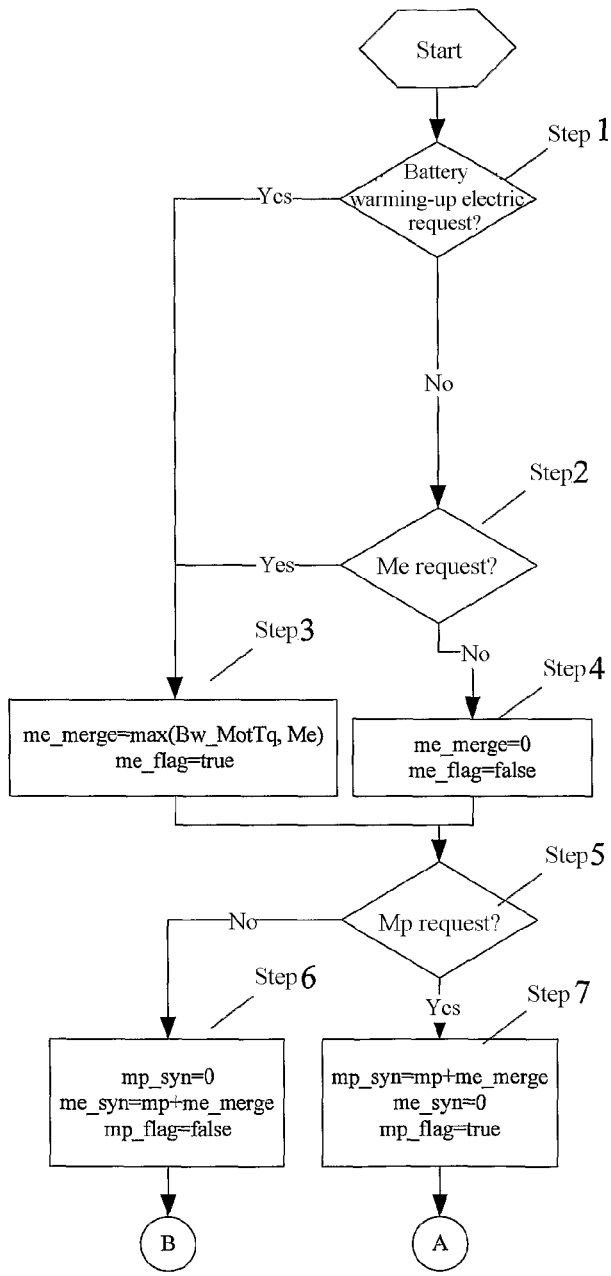

Me- efficiency driving torque request
Mp- performance electric torque request
me_merge- efficiency electric torque request
me_flag- efficiency electric torque request flag
mp_flag- performance electric torque request flag
Bw_MotTq- battery warming-up electric torque request
mp_syn- synthesized performance electric torque
me_syn- synthesized efficiency electric torque

FIG. 3A mp_init_limit- initial value of performance electric torque limit
me_init_limit- initial value of efficiency electric torque limit
cont_max- maximum continuous torque of motor
peak_torque- peak torque of motor
mp_limit- performance electric torque limit
me_limit- efficiency electric torque limit

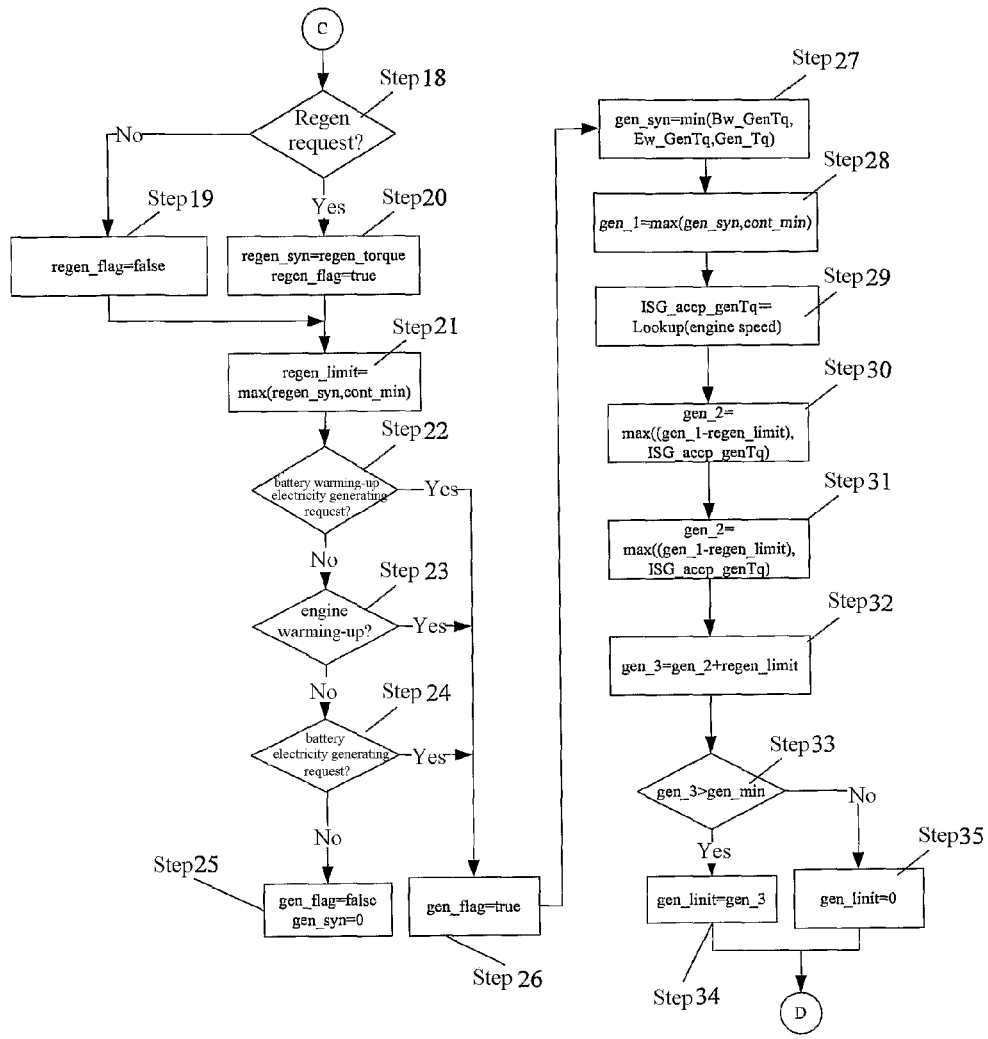

Regen- regenerative braking torque request regen_flag- regenerative braking torque request flag regen_syn- synthesized regenerative braking torque regen_limit- regenerative braking torque limit gen_flag- electricity generating torque request flag gen_syn- synthesized electricity generating torque gen_limit- electricity generating torque limit Bw_GenTq- battery warming-up electricity generating torque request cont_min- minimum continuous torque of motor ISG_accp_genTq- maximum acceptable electricity generating torque of engine gen_1- first electricity generating torque gen_2- second electricity generating torque gen_3- third electricity generating torque

FIG. 4

TORQUE MANAGEMENT METHOD FOR HYBRID ELECTRIC MOTOR

This application claims the benefit of Chinese Patent Application No. 200710164139.x, titled "Motor torque management method for hybrid vehicle", filed with the China Patent Office on Sep. 30, 2007, which is incorporated herein by reference in its entirety.

FIELD OF THE INVENTION

The present invention relates to the field of hybrid vehicle control, and in particular, to a motor torque management method for hybrid vehicles.

BACKGROUND OF THE INVENTION

Energy crisis and environmental pollution have become great bottlenecks to global economy development. Energy-saving and environment friendly vehicles provide a good way to release energy pressure and reduce environmental pollution. Hybrid vehicles have the advantages of both internal-combustion engine vehicles and pure electric vehicles, such as low gasoline consumption, less emissions and long mileage, and therefore would be a feasible solution to energy crisis and environmental pollution.

Parallel hybrid vehicles have two power sources, an engine and a motor. A Hybrid Control Unit (HCU) determines a working mode based on a current operation state of the vehicle, and sends a power request and a mode request to the engine and the motor, respectively. Control units of the engine and the motor control respective power sources according to an instruction of the HCU, to meet requirements of the whole vehicle.

When the hybrid vehicle sends a torque request for auxiliary driving, electricity generating or regenerative braking, the HCU limits the torque request according to the status of the motor, battery and engine. If more than two of the torque requests above are present, the HCU is to arbitrate the torque requests, then send a torque request to the motor. Therefore, how to limit the torque requests and whether torque arbitration mechanism is suitable will affect performance of the hybrid vehicle.

SUMMARY OF THE INVENTION

The present invention proposes a priority based motor torque management method, especially suitable for coaxial parallel moderate hybrid vehicles, thereby realizing the management of a plurality of torque request sources.

The invention includes: electric mode torque synthesis and limitation, electricity generating mode torque synthesis and limitation, torque arbitration management, etc.

1. An electric mode torque request is a toque request for the motor to work in an electric mode, and in the present invention, this type of torque requests include auxiliary driving torque requests and battery warming-up torque (Bw_MotTq) requests. Auxiliary driving torque requests include driving torque requests aiming for fulfilling vehicle power performance (Mp) and driving torque requests aiming for improving vehicle efficiency (Me). Both the battery warming-up torque request and the driving torque request aiming for efficiency are to improve vehicle efficiency, and therefore the larger one of these two is selected to be an efficiency electric torque request (Me_Merge).

If one or more of the torque requests above are present, in order to prevent the motor from being damaged by a requested torque that is too large or too small, the HCU limits the electric toque requests within a proper range according to conditions such as peak torque allowed by the motor and maximum allowed torque in continuous operation, thereby getting an efficiency electric torque limit (Me_Limit) and a performance electric torque limit (Mp_Limit).

2. An electricity generating mode torque request is a torque request for the motor to work in an electricity generating mode, and in this invention, this type of torque requests include electricity generating requests in the event that the State of Charge (SOC) of the battery is low, regenerative braking torque requests (Regen), battery warming-up torque requests (Bw_GenTq) and engine warming-up torque requests (Ew_GenTq).

When the battery or the engine needs to be warmed up, or the battery requires charging, the engine may have to provide all or part of the electricity generating torque, therefore the smallest one of Gen, Bw_GenTq and Ew_GenTq is selected to be a synthesized electricity generating torque Gen_Syn.

When the torque requests above are present, the motor have to work in an electricity generating state, and the requested torque has a negative value. In order to limit the motor electricity generating torque in a proper range, the HCU limits the electricity generating torque according to the minimum continuous torque allowed by the motor, thereby getting a regenerative braking toque limit (Regen_Limit) and an electricity generating torque limit (Gen_Limit).

3. Torque arbitration management: when a plurality of torque requests are present, the HCU arbitrates according to priorities of the torque requests, and makes a torque having the highest priority a current torque request. Torques in the order of their priorities from highest to lowest are: Mp_Limit, Regen_Limit, Gen_Limit and Me_Limit. As can be seen from the priorities, auxiliary driving aiming for fulfilling vehicle power performance has the highest priority, the regenerative braking torque request is lower, then goes the electricity generating torque request, and finally auxiliary driving aiming for efficiency.

If a plurality of torque request sources are present, the HCU determines according to the priorities above, responds to the torque request with the highest priority, and then sends a torque request to the engine and motor control modules, respectively.

BRIEF DESCRIPTION OF THE DRAWINGS

FIG. 3A is a flow chart A for electric mode torque synthesis and limitation;

FIG. 4 is a flow chart for electricity generating mode torque synthesis and limitation.

DETAILED DESCRIPTION OF THE INVENTION

Figure 1:
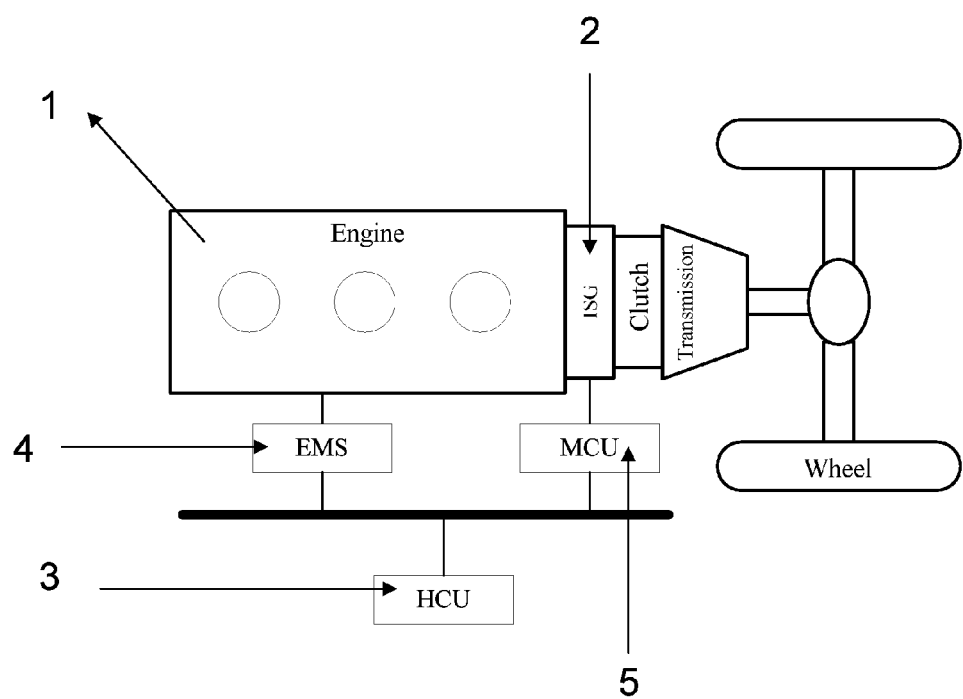
FIG. 1 is a mechanical connection diagram of the invention.

As shown in FIG. 1, the hybrid vehicle is a uniaxial parallel hybrid vehicle, an engine 1 and a motor 2 are coaxially arranged, and the motor 2 is an ISG (Integrated Starter Generator) motor with integrated electricity generating and electric functions. The power system of the hybrid vehicle uses three control units: a Hybrid Control Unit (HCU) 3, an Engine Management System (EMS) 4 and a Motor Control Unit (MCU) 5. The three control units are responsible for controlling the vehicle, the engine and the motor, respectively.

The ISG may work in a torque mode, a speed mode and a zero torque mode. The torque mode is a working mode aiming for fulfilling torque requests of the HCU. In the invention, when the motor works in the torque mode, the motor has the functions of: auxiliary driving (Mp, Me), electricity generating (Gen) and regenerative braking (Regen).

Figure 2:
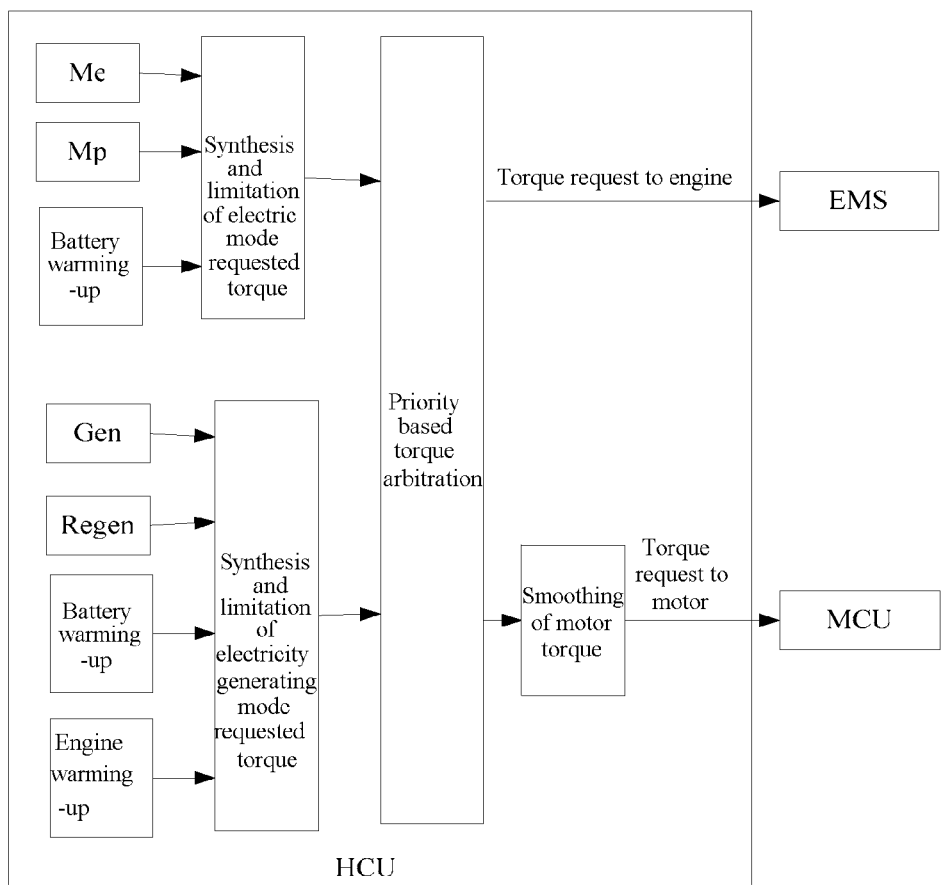
FIG. 2 is a structural diagram of the control principle of the invention.

FIG. 2 illustrates a structural diagram of torque management performed by the HCU according to the invention. The implementation method is described below. The HCU determines torque requests of the system based on e.g. a vehicle state, or a driver requirement, and identifies the torque requests as electric mode torque requests and electricity generating mode torque requests, then synthesizes and limits the requested torques, so as to make sure that each of the torque requests is within a proper range, next, arbitrates the torques based on set priorities, and sends a torque request with the highest priority to the motor control module after smoothing, thereby obtaining the required torque.

1. Electric Mode Torque Synthesis and Limitation

Electric mode torque requests are toque requests for the motor to work in an electric mode, and in the present invention, this type of torque requests include auxiliary driving torque requests and battery warming-up torque (Bw_MotTq) requests. Auxiliary driving torque requests include driving torque requests aiming for fulfilling vehicle power performance (Mp) and driving torque requests aiming for improving vehicle efficiency (Me). Both the battery warming-up torque request and the driving torque request aiming for efficiency are to improve vehicle efficiency, and therefore the larger one of these two is selected to be an efficiency electric torque request (Me_Merge).

If one or more of the torque requests above are present, in order to prevent the motor from being damaged by a requested torque that is too large or too small, the HCU limits the electric toque requests within a proper range according to conditions such as peak torque allowed by the motor and maximum allowed torque in continuous operation, thereby getting an efficiency electric torque limit (Me_Limit) and a performance electric torque limit (Mp_Limit).

Figure 3B:
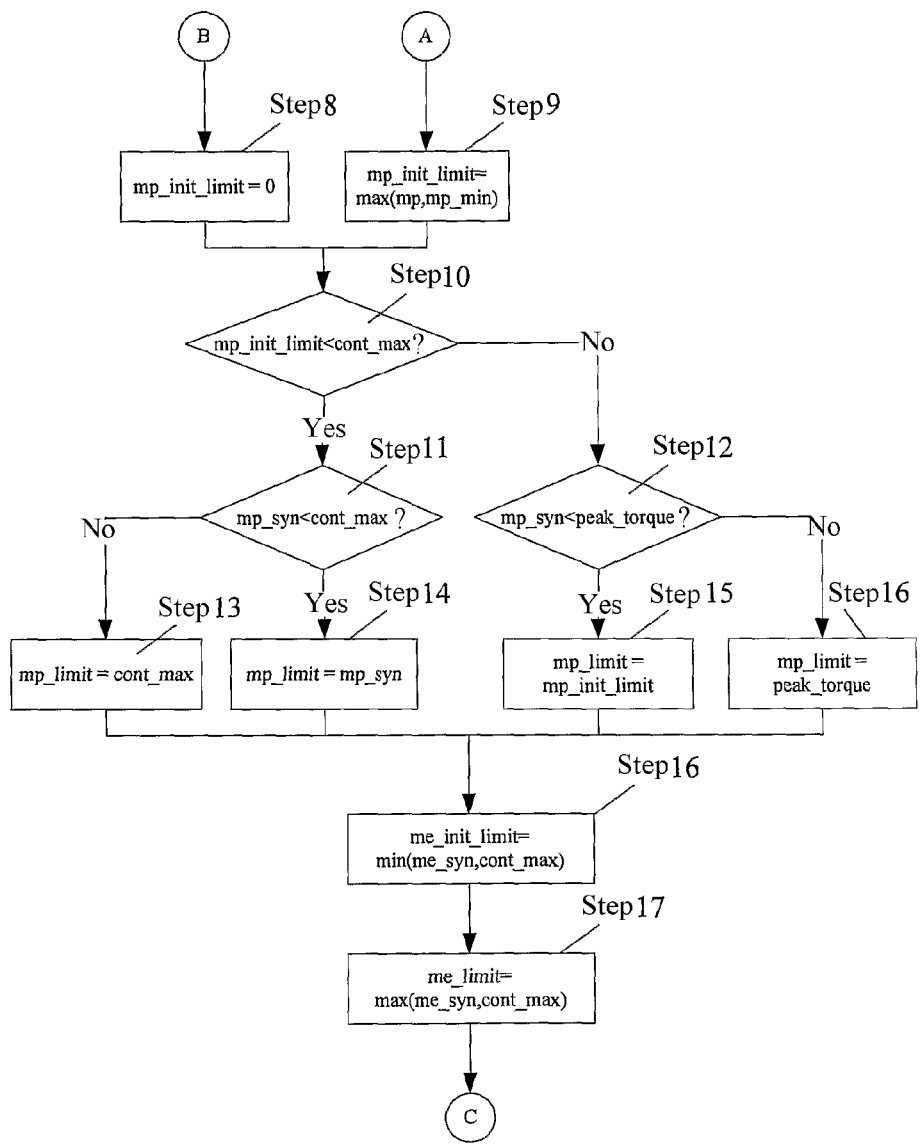
FIG. 3B is a flow chart B for electric mode torque synthesis and limitation.

The torque synthesis and limitation process in the electric mode is shown in FIGS. 3A and 3B. Step 1 to step 4 illustrate the synthesis processes for Me and Bw_MotTq torques. If there is an Me request or the battery needs to be warmed up, the efficiency electric torque flag (me_flag) is set to be 1, and the larger one of the two torques is selected to be a synthesized efficiency electric torque me_merge. Step 5-step 7 illustrate the process for determining whether there is an Mp request affecting synthesized torques mp_syn and me_syn. Step 8-step 16 illustrate the process for limiting mp_syn and obtaining a performance torque limit mp_limit. The limitation process is described below. First, determine whether an initial value of the performance toque limit mp_init_limit is smaller than the maximum continuous torque (cont_max) that the motor can provide currently (S10); and if it is not smaller than the maximum continuous torque of the motor, go to step 12. In step 12, determine whether mp_syn is smaller than the peak toque of the motor (peak_torque); and if so, set mp_limit to be mp_init_limit (step 15); if not, i.e., mp_syn is larger than the maximum torque that the motor can provide, then set the requested torque to be the peak torque of the motor (step 16). If it is true in step 10, further determine whether mp_syn is larger than the maximum continuous torque of the motor (step 11); and if it is not larger than the maximum continuous torque of the motor, set mp_limit to be mp_syn (step 14); and if it is larger than the maximum continuous torque of the motor, limit mp_limit to be the maximum continuous torque of the motor (step 13). By the process above, the synthesized performance electric torque is limited within the range between the continuous torque and the peak torque of the motor.

Step 16 and step 17 illustrates the processes for limiting the torque Me, by which the requested value of Me is limited between a set minimum value and the maximum continuous operating torque of the motor.

2. Electricity Generating Mode Torque Synthesis and Limitation

Electricity generating mode torque requests are torque requests for the motor to work in an electricity generating mode, and in this invention, this type of torque requests include electricity generating requests in the event that the State of Charge (SOC) of the battery is low, regenerative braking torque requests (Regen), battery warming-up torque requests (Bw_GenTq) and engine warming-up torque requests (Ew_GenTq).

When the battery or the engine needs to be warmed up, or the battery requires charging, the engine may have to provide all or part of the electricity generating torque, therefore the smallest one of Gen, Bw_GenTq and Ew_GenTq is selected to be a synthesized electricity generating torque Gen_Syn.

When the torque requests above are present, the motor have to work in an electricity generating state, and the requested torque has a negative value. In order to limit the motor electricity generating torque in a proper range, the HCU limits the electricity generating torque according to the minimum continuous torque allowed by the motor, thereby getting a regenerative braking toque limit (Regen_Limit) and an electricity generating torque limit (Gen_Limit).

FIG. 4 shows the torque synthesis and limitation process in the electricity generating mode. Step 18-step 21 illustrate the processing of a regenerative braking torque, and when there is a regenerative braking torque request, a corresponding flag (regen_flag) is set to be 1 (true), and the requested braking torque can not be smaller than the minimum continuous operating torque of the motor (step 21).

Step 22-step 35 illustrates the processing of the electricity generating torque. The process is described below. When one of the conditions for battery warming-up electricity generating requests, engine warming-up requests and battery charging requests is met, set the synthesized electricity generating request flag to be 1 (step 26), and select the smallest one the three toques to be the electricity generating torque request (step 27). Step 29 shows that the electricity generating torque can not be smaller than the minimum continuous operating torque of the motor. In step 30, an acceptable electricity generating torque for the engine is obtained by looking up a rotation speed table of the current motor. Step 31 shows that the electricity generating torque can not exceed the acceptable range for the engine under the current rotation speed. The electricity generating request is that, the torque that the engine has to provide equals the total electricity generating requested torque minus the torque that regenerative brake provides. Step 33-step 35 show that if the electricity generating requested torque is larger than a set minimum value (note that electricity generating torques have a negative value), the electricity generating torque is set to be zero.

3. Torque Arbitration Management

When a plurality of torque requests are present, the HCU arbitrates according to priorities of the torque requests, and makes a torque with the highest priority a current torque request. Torques in the order of their priorities from highest to lowest are: Mp_Limit, Regen_Limit, Gen_Limit and Me_Limit. As can be seen from the priorities, auxiliary driving aiming for fulfilling vehicle power performance has the highest priority, the regenerative braking torque request is lower, then goes the electricity generating torque request, and finally auxiliary driving aiming for efficiency.

If a plurality of torque request sources are present, the HCU determines according to the priorities above, responds to the torque request with the highest priority, and then sends a torque request to the engine and motor control modules, respectively.

Figure 5:
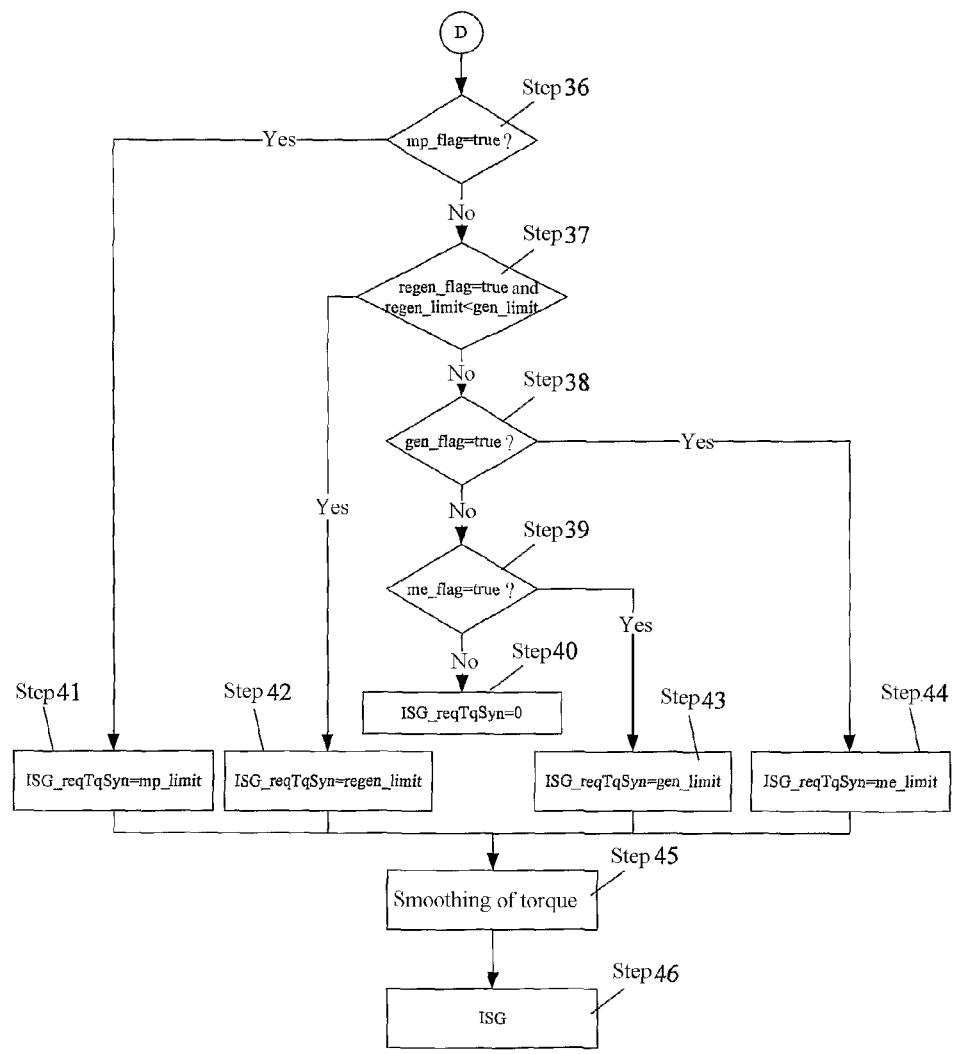
FIG. 5 is a flow chart for torque arbitration.

FIG. 5 illustrates the arbitration process of the torques after synthesis and limitation. First, determine the request Mp having the highest priority; and if Mp_flag is 1 (true), set the torque request value of the motor (ISG_reqTqSyn) to be mp_limit (step 41); if there is no Mp request, determine whether there is a regenerative braking torque request (regen_flag), and if there is and the requested torque is smaller than the electricity generating requested torque, set the torque request sent to the motor to be regen_limit (step 42); if there is no regenerative braking torque request, determine whether there is a electricity generating request (gen_flag), and if so, set ISG_reqTqSyn to be gen_limit (step 43); if there is no electricity generating torque request, determine whether there is an Me request, and if so, set ISG_reqTqSyn to be me_limit (step 44); if there is no Me request, set ISG_reqTqSyn to be zero. After the torque request to be sent to the ISG is calculated, smoothing of the torque is performed (S45).

The torque request after torque arbitration and smoothing is sent to the ISG in the end, to fulfill torque requirements of the HCU, and thereby realizing various torque working modes of the hybrid vehicle in the invention.

The invention claimed is:

1. A motor torque management method, comprising:
    determining, by a Hybrid Control Unit, HCU, torque requests of a system according to a vehicle state and a driver requirement;
    performing synthesis and limitation on requested torques so that each of the torque requests is within a proper range;
    arbitrating the torques according to set priorities; and
    sending a torque request having the highest priority to a motor control module after smoothing of the torque request, so as to obtain a required torque;
    wherein: the torque requests comprise an electric mode torque request and an electricity generating mode torque request; and the management method comprises: electric mode torque synthesis and limitation, electricity generating mode torque synthesis and limitation, and torque arbitration management;
    wherein: the electric mode torque request comprises an auxiliary driving torque request and a battery warming-up torque request, and the auxiliary driving torque request comprises a performance electric torque request aiming for fulfilling vehicle power performance and an efficiency electric torque request aiming for improving vehicle efficiency; and the electric mode torque synthesis and limitation comprise synthesis and limitation of a performance electric torque, by which a performance electric torque limit is obtained, and comprise synthesis limitation of an efficiency electric torque, by which an efficiency electric torque limit is obtained.

2. The motor torque management method according to claim 1, wherein, the synthesis and limitation of the performance electric torque comprise:
    determining whether an initial value of the performance electric torque limit is smaller than a maximum continuous torque that the motor can provide; and
    if the initial value of the performance electric torque limit is smaller than the maximum continuous torque of the motor, further determining whether a synthesized performance electric torque is smaller than the maximum continuous torque of the motor; and
    if the synthesized performance electric torque is smaller than the maximum continuous torque of the motor, setting the performance electric torque limit to be the synthesized performance electric torque; and
    if the synthesized performance electric torque is not smaller than the maximum continuous torque of the motor, limiting the synthesized performance electric torque to be the maximum continuous torque of the motor; and
    if the initial value of the performance electric torque limit is not smaller than the maximum continuous torque of the motor, determining whether the synthesized performance electric torque is smaller than a peak torque of the motor; and
    if the synthesized performance electric torque is smaller than a peak torque of the motor, setting a final value of the performance electric torque limit to be the initial value of the performance electric torque limit; and
    if the synthesized performance electric torque is not smaller than the peak torque of the motor, setting a requested torque to be the peak torque of the motor.

3. The motor torque management method according to claim 2, wherein: the torque arbitration management comprises: when a plurality of torque requests are present at the same time, arbitrating by the HCU according to priorities of the torque requests, and selecting a torque having the highest priority to be a current torque request.

4. The motor torque management method according to claim 2, wherein the management method is adapted for a coaxial parallel moderate hybrid vehicle.

5. The motor torque management method according to claim 1, wherein, synthesis and limitation of the efficiency electric torque comprise:
    selecting the smaller one of a synthesized efficiency electric torque and a minimum continuous value of the motor to be an initial value of the efficiency electric torque limit; and
    selecting the larger one of the synthesized efficiency electric torque and a set minimum torque of the motor to be the efficiency electric torque limit.

6. The motor torque management method according to claim 5, wherein: the torque arbitration management comprises: when a plurality of torque requests are present at the same time, arbitrating by the HCU according to priorities of the torque requests, and selecting a torque having the highest priority to be a current torque request.

7. The motor torque management method according to claim 5, wherein the management method is adapted for a coaxial parallel moderate hybrid vehicle.

8. The motor torque management method according to claim 1, wherein:
    the electricity generating mode torque request comprises an electricity generating request in the event of low State of Charge, SOC, of a battery, a regenerative braking torque request, a battery warming-up torque request and an engine warming-up torque request;
    when the torque requests above are present, the HCU limits an electricity generating torque according to a minimum continuous torque allowed by the motor, and obtains a regenerative braking torque limit and an electricity generating torque limit.

9. The motor torque management method according to claim 8, wherein: the electricity generating mode torque synthesis and limitation comprise two parts, and the first part comprises: obtaining the regenerative braking torque limit by limiting the regenerative braking torque to be above the minimum continuous torque of the motor; and the second part comprises:

selecting the smallest one of engine warming-up, battery warming-up and battery charging torques to be a synthesized electricity generating torque, obtaining a first electricity generating torque by limiting the synthesized electricity generating torque to be above the minimum continuous torque of the motor;

obtaining a second electricity generating torque by limiting a difference between the first electricity generating torque value and the regenerative braking torque limit within an acceptable maximum electricity generating torque for the engine;

obtaining a third electricity generating torque by summing the second electricity generating torque value and the regenerative braking torque limit, limiting the third electricity generating torque to be above a minimum torque; and taking the third electricity generating torque as the electricity generating torque limit.

10. The motor torque management method according to claim 9, wherein: the torque arbitration management comprises: when a plurality of torque requests are present at the same time, arbitrating by the HCU according to priorities of the torque requests, and selecting a torque having the highest priority to be a current torque request.

11. The motor torque management method according to claim 8, wherein: the torque arbitration management comprises: when a plurality of torque requests are present at the same time, arbitrating by the HCU according to priorities of the torque requests, and selecting a torque having the highest priority to be a current torque request.

12. The motor torque management method according to claim 8, wherein the management method is adapted for a coaxial parallel moderate hybrid vehicle.

13. The motor torque management method according to claim 1, wherein:

the torque arbitration management comprises:

when a plurality of torque requests are present at the same time, arbitrating by the HCU according to priorities of the torque requests, and selecting a torque having the highest priority to be a current torque request.

14. The motor torque management method according to claim 13, wherein: the torques in the order of their priorities from highest to lowest are: performance electric torque limit, regenerative braking torque limit, electricity generating torque limit, and efficiency electric torque limit.

15. The motor torque management method according to claim 1, wherein the management method is adapted for a coaxial parallel moderate hybrid vehicle.

16. The motor torque management method according to claim 1, wherein:

the torque arbitration management comprises:

when a plurality of torque requests are present at the same time, arbitrating by the HCU according to priorities of the torque requests, and selecting a torque having the highest priority to be a current torque request.

17. The motor torque management method according to claim 1, wherein the management method is adapted for a coaxial parallel moderate hybrid vehicle.

18. The motor torque management method according to claim 1, wherein the management method is adapted for a coaxial parallel moderate hybrid vehicle.

* * * * *